United States Patent
Obrist (10) Patent No.: US 11,674,513 B2
(45) Date of Patent: Jun. 13, 2023

(54) METHOD AND APPARATUS FOR CONTROLLING A SCROLL COMPRESSOR USING TORQUE PROGRESSION TO REDUCE VIBRATION

(71) Applicant: OET GmbH, Lustenau (AT)

(72) Inventor: Frank Obrist, Bregenz (AT)

(73) Assignee: GET GmbH, Lustenau (AT)

( * ) Notice: Subject to any disclaimer, the term of this patent is extended or adjusted under 35 U.S.C. 154(b) by 0 days.

(21) Appl. No.: 17/286,127

(22) PCT Filed: Oct. 10, 2019

(86) PCT No.: PCT/EP2019/077483
§ 371 (c)(1),
(2) Date: Apr. 16, 2021

(87) PCT Pub. No.: WO2020/078821
PCT Pub. Date: Apr. 23, 2020

(65) Prior Publication Data
US 2021/0381512 A1   Dec. 9, 2021

(30) Foreign Application Priority Data
Oct. 19, 2018   (DE) .................. 10 2018 125 999.9

(51) Int. Cl.
*F04C 28/08*   (2006.01)
*F04C 18/02*   (2006.01)
(Continued)

(52) U.S. Cl.
CPC .......... *F04C 28/08* (2013.01); *F04C 18/0207* (2013.01); *F04C 18/0215* (2013.01);
(Continued)

(58) Field of Classification Search
CPC ........ F04C 2/025; F04C 18/0207–0292; F04C 2270/03–035; F04C 2270/12–125; F04C 2270/06–065
See application file for complete search history.

(56) References Cited

U.S. PATENT DOCUMENTS 3,884,599 A   5/1975   Young et al.
4,604,036 A   8/1986   Sutou et al.
(Continued)

FOREIGN PATENT DOCUMENTS

DE   102015120151 A1   11/2015
DE   102017107538 A1   4/2017
(Continued)

OTHER PUBLICATIONS

PCT Notification of Transmittal of the International Search Report and the Written Opinion of the International Searching Authority, or the Declaration, International Searching Authority, International Application No. PCT/EP2019/077483, dated Oct. 10, 2019, 16 pages.
(Continued)

*Primary Examiner* — Laert Dounis
(74) *Attorney, Agent, or Firm* — Cesari and McKenna, LLP (57) ABSTRACT

The invention relates to a method used to control a scroll compressor having a first and a second spiral, in particular that are arranged one inside the other. The first spiral can be moved by a motor relative to the second spiral for a decompression or compression operation of the scroll compressor. The invention reduces vibration (actual acceleration forces) in the scroll compressor to allow for a longer service life by adapting a torque curve of the motor on the basis of measured acceleration forces on the scroll compressor which, in turn, is based on the position and/or positional angle of the first spiral relative to the second spiral such that
(Continued)

the acceleration forces are reduced below a threshold or minimized.

18 Claims, 12 Drawing Sheets

(51) Int. Cl.
    *F04C 29/00*      (2006.01)
    *H02P 21/20*      (2016.01)

(52) U.S. Cl.
    CPC .......... *F04C 29/0085* (2013.01); *H02P 21/20* (2016.02); *F04C 2240/40* (2013.01); *F04C 2270/035* (2013.01); *F04C 2270/065* (2013.01); *F04C 2270/125* (2013.01); *H02P 2205/05* (2013.01)

(56) References Cited

U.S. PATENT DOCUMENTS

| | | | |
|---|---|---|---|
| 5,478,223 A | | 12/1995 | Yamamoto et al. |
| 8,084,977 B2 * | | 12/2011 | Hashimoto ............. H02P 21/05 |
| | | | 318/560 |
| 2004/0070364 A1 | | 4/2004 | Cheong et al. |
| 2008/0315816 A1 * | | 12/2008 | Hashimoto ........... F04B 49/065 |
| | | | 318/461 |
| 2012/0251361 A1 * | | 10/2012 | Yokoi ..................... F04C 29/06 |
| | | | 417/423.7 |
| 2014/0216081 A1 | | 8/2014 | West et al. |
| 2015/0198160 A1 | | 7/2015 | Poschenrieder et al. |

FOREIGN PATENT DOCUMENTS

| | | | |
|---|---|---|---|
| EP | 2007005 A2 | | 12/2008 |
| JP | 61015590 A | * | 1/1986 |
| JP | S-63147986 A | | 6/1988 |
| JP | H11257258 A | | 9/1999 |
| JP | 2006042419 A | * | 2/2006 |
| JP | 2007295674 A | | 11/2007 |
| KR | 910000097 B1 | * | 1/1991 |

OTHER PUBLICATIONS

German Search Report, file No. DE 10 2018 125 999.9 dated Sep. 13, 2019, 10 pages.

* cited by examiner

METHOD AND APPARATUS FOR CONTROLLING A SCROLL COMPRESSOR USING TORQUE PROGRESSION TO REDUCE VIBRATION

CROSS REFERENCE TO RELATED APPLICATIONS

This application is the National Stage of International Application No. PCT/EP2019/077483, filed Oct. 10, 2019, which claims the benefit of German Patent Application No. 102018125999.9 filed on Oct. 19, 2018. The contents of both applications are hereby incorporated by reference in their entirety.

The present invention relates to a method for controlling a scroll compressor, and also to a controller for a scroll compressor.

A scroll compressor is a machine that can further transport and additionally compress gases in particular and fluids in general, similarly to a pump. For this purpose, a scroll compressor has two spirals arranged one inside the other, whose opposite movements relative to each other compress the gas in portions. To this end, for example, a first spiral is stationarily positioned, and the second spiral can be moved on a circular path around the midpoint of the first spiral, in particular without self-rotation. Moving the second spiral in relation to the first one always forms a chamber or cavity between the two spirals, which is displaced toward the midpoint or toward the exterior side of the spirals as a function of the direction of rotation of the movement. As a rule, the spiral is moved in such a way that the gas to be pumped is aspirated from outside, compressed inside of the pump and ejected in the spiral center via a port.

Due to the compression or decompression process, and in particular because the torque is not constantly required over the circular movement path, the scroll compressor can develop acceleration forces that are transferred to the scroll housing, among other places. This can result in strong vibrations, which damage the spirals of the scroll compressor and/or its housing in the long run, and thus reduce the operating life of the scroll compressor.

In addition, scroll compressors or compressors should operate with as little vibration as possible in electrically driven vehicles (without an internal combustion engine), since vibrations in electric vehicles are lower from the ground up by comparison to fossil-fueled vehicles, and no additional vibration sources, for example such as a scroll compressor, are desired.

In light of the above, the goal is to find a method that essentially prolongs the operating life of a scroll compressor.

Provided according to the invention for this purpose is a method for controlling the scroll compressor according to claim 1. The method serves to control a scroll compressor, which in particular has a first and a second spiral, which are arranged one inside the other. The first spiral can here be moved relative to the second spiral for a decompression or compression operation of the scroll compressor. The method comprises the following steps:
  Operating a motor for moving the first spiral;
  Measuring a plurality of acceleration forces on the scroll compressor, wherein the acceleration forces depend on a relative position and/or a positional angle of the first spiral to the second spiral;
  Operating the motor by adjusting the torque progression of the motor as a function of the measured acceleration forces in such a way as to decrease the acceleration forces.

The advantage to this method is that a scroll compressor having no internal or built-in sensors can be better controlled. As a result, already known electrically operated scroll compressors need not be replaced by newly conceived and built scroll compressors, which saves costs and time while correspondingly upgrading the scroll compressor.

The low-vibration operation preserves the components of the scroll compressor, in particular the spirals and bearing elements connected therewith, and protects them against excessive wear. At the same time, a longer operating life can thus be ensured for the scroll compressor.

The acceleration forces are preferably measured by corresponding sensors, which can be arranged on the exterior side of a scroll compressor. Otherwise, the scroll compressor can be defined and measured with respect to its suction pressure and/or its high pressure. Additionally available information includes the torque progressions or map diagrams of the scroll compressor and electric motor, which describe the required or available torque as a function of the angle/phase and/or rotational speed.

It has further proven advantageous that adjusting the torque progression of the motor comprise the following steps:
  Shifting a torque phase of the motor in a first direction;
  Measuring the plurality of acceleration forces;
  when the acceleration forces increase, shifting the torque phase of the motor in a second direction opposite the first direction;
  when the acceleration forces decrease, continue shifting the torque phase of the motor in the current direction until a minimum for the acceleration forces has been reached.

The advantage to these steps is that the power to be supplied by the motor remains constant, so that no additional electrical power is required. The motor can also be retained, and need not be replaced with a more powerful motor so as to reduce the vibrations. The torque to be supplied by the motor is shifted as a function of the angle/phase or of the position of the second spiral relative to the first spiral. Each electric motor has a characteristic that describes the torque of the motor as a function of the supplied current and/or voltage, as well as of the angle of the motor shaft. As soon as the torque of the motor is shifted in terms of phase or angle so as to essentially become congruent with the required torque characteristic of the scroll compressor, the difference between the torque supplied by the motor and the torque required by the scroll compressor decreases. Vibrations here only arise when the required torque has a higher amplitude than the available torque. Since the characteristic of the torque required for the scroll compressor periodically repeats after 360°, meaning after one revolution of the spiral, and only has one maximum, an angle/phase shift in the torque of the electric motor immediately makes it clear whether the vibrations are being reduced and in what direction, in particular clockwise or counterclockwise, shifting must occur for this purpose.

Adjusting the torque progression of the motor additionally or alternatively preferably also comprises the following steps:
  Changing a torque amplitude of the motor in a first direction;
  Measuring the plurality of acceleration forces;
  when the acceleration forces increase, changing the torque amplitudes of the motor in a second direction opposite the first direction;

when the acceleration forces decrease, continue changing the torque amplitudes of the motor in the current direction until a minimum for the acceleration forces has been reached.

These advantageous steps can additionally or alternatively be used for shifting the torque phase. The strength or amplitude of the torque is here changed until such time as the vibrations reach a minimum and/or the changes in vibrations, in particular the decrease thereof, no longer exceed a (pre)determined value. The amplitude of the torque can likewise be decreased to a point at which the vibrations start to intensify again. These steps have the advantage of providing a quantity of energy adjusted to the demand of the scroll compressor, while simultaneously enabling a low-vibration and energy-efficient operation.

If and when the acceleration forces decrease, the torque amplitude of the motor preferably continues to change in the current direction until such time as the change in the decrease of acceleration forces has reached a predetermined value. This step is intended to accelerate the method and end it within a foreseeable time period. Even if the motor supplies a torque amplitude that exceeds the value required by the scroll compressor, vibrations could continue to be measured. As soon as the changes in vibration are hardly decreased any longer despite the changes in torque amplitude, the power amplification of the motor is not to be indefinitely increased, but rather stopped; in particular, this economizes on electrical energy.

In another advantageous embodiment, the acceleration forces are decreased in such a way that the measured maximum value and/or the sum of measured values is/are decreased over at least one circulation or one circulation section of the first or second spiral. This step is to ensure that the vibrations are not decreased for just one point in time and/or only one angular position, but preferably over one or more complete revolution/circulations of the movable spiral.

Likewise provided by the invention is a controller according to claim 4. This controller is designed for a scroll compressor with a first and second spiral, which are arranged one inside the other. In addition, the controller is designed to control a motor so as to move a first spiral for a decompression or compression operation of the scroll compressor relative to a second spiral, acquire a plurality of acceleration forces on the scroll compressor as measured values, wherein the acceleration forces depend on a relative position and/or a positional angle of the first spiral to the second spiral; and control the motor by adjusting the torque progression of the motor as a function of the measured acceleration forces in such a way as to decrease the acquired measured values for the acceleration forces.

The controller according to the invention has the same advantages as the control method described above, and is essentially designed to perform the same steps as in this method, in particular additionally or alternatively, or implement them for the scroll compressor. The method according to the invention can vice versa additionally or alternatively have the features of the controller according to the invention, in particular its control steps.

In addition, the controller is preferably designed to adjust the torque progression of the motor in such a way as to shift a torque phase of the motor in a first direction; wherein, if the acquired measured values for the acceleration forces increase, the torque phase of the motor shifts in a second direction opposite the first direction, and if the acquired measured values for the acceleration forces decrease, the torque phase of the motor continues shifting in the current direction until a minimum for the acceleration forces has been reached.

The controller is advantageously designed to adjust the torque progression of the motor in such a way as to shift a torque amplitude of the motor in a first direction; wherein, if the acquired measured values for the acceleration forces increase, the torque amplitude of the motor shifts in a second direction opposite the first direction, and if the acquired measured values for the acceleration forces decrease, the torque amplitude of the motor continues shifting in the current direction until a minimum for the acceleration forces has been reached.

In another advantageous embodiment, the controller is designed in such a way, if the acceleration forces decrease, as to change the torque amplitude of the motor in the current direction until such time as the change in the decrease of acceleration forces has reached a predetermined value.

It has likewise proven advantageous to design the controller so as to decrease the acceleration forces in such a way that the measured maximum value and/or sum of measured values is/are decreased over one circulation or circulation section of the first spiral.

Also provided on the one hand is a scroll compressor with a controller according to the invention, and on the other hand a computer-readable storage medium with stored instructions, which when executed by at least one processor, prompt the at least one processor to implement the method according to the invention.

The figures described below essentially relate to preferred exemplary embodiments of the controller according to the invention and of the method according to the invention, wherein these figures serve not to limit, but essentially to illustrate the invention.

Shown on.

Figure 1:
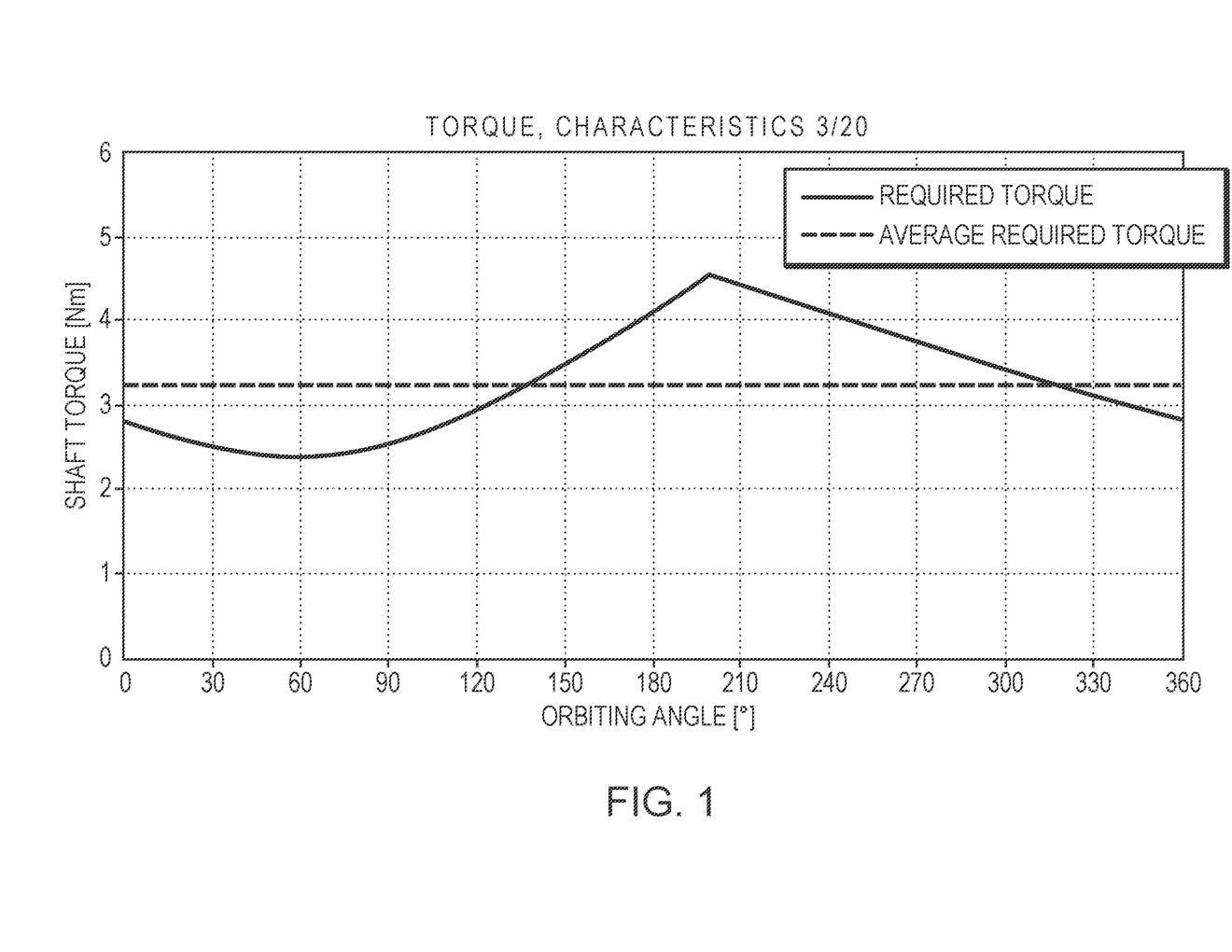
FIG. 1 is a torque characteristic diagram for a scroll compressor with an inlet and outlet pressure ratio of 3/20.

FIG. 1 shows a torque characteristic diagram for a scroll compressor with an inlet and outlet pressure ratio of 3/20; i.e., a 3 bar inlet pressure and a 20 bar outlet pressure. The average required torque for the scroll compressor measures approx. 3.2 nm (see dashed line), so as to realize the mentioned pressure ratio. Depending on the orbiting angle (English orbiting angle), the actual torque (see solid line) begins with approx. 2.8 nm at 0 degrees and continuously drops to a minimum of approx. 2.4 nm at 60 degrees. The required torque then continuously rises to a maximum of approx. 4.5 nm at approx. 200 degrees and continuously drops to approx. 2.8 nm at 360 degrees. This characteristic repeats with each orbit.

Figure 2:
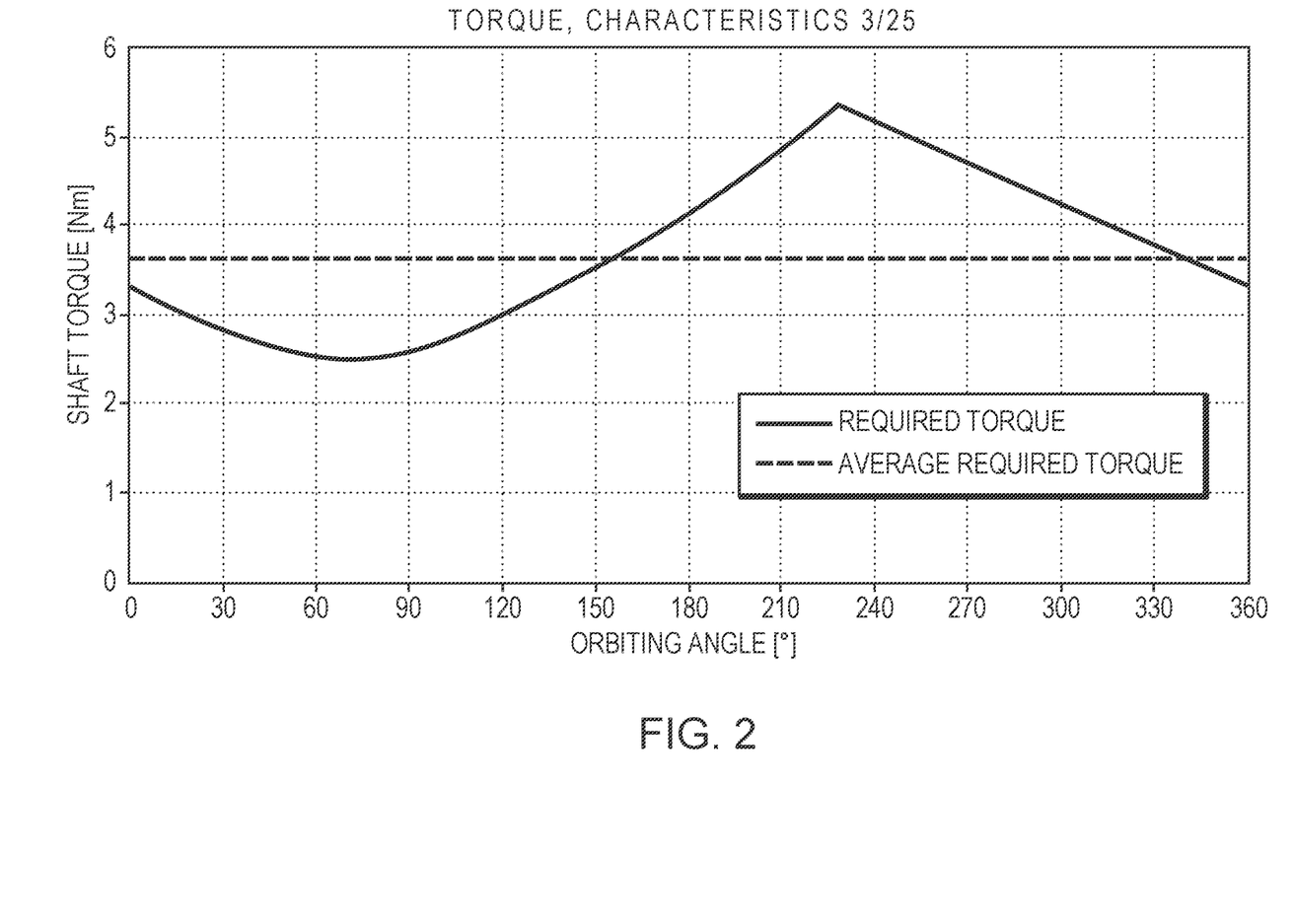
FIG. 2 is a torque characteristic diagram for a scroll compressor with an inlet and outlet pressure ratio of 3/25.

FIG. 2 shows a torque characteristic diagram for a scroll compressor with an inlet and outlet pressure ratio of 3/25. The average required torque for the scroll compressor measures approx. 3.6 nm (see dashed line), so as to realize the mentioned pressure ratio. Depending on the orbiting angle, the actual torque (see solid line) begins with approx. 3.4 nm at 0 degrees and continuously drops to a minimum of approx. 2.5 nm at 70 degrees. The required torque then continuously rises to a maximum of approx. 5.3 nm at approx. 230 degrees and continuously drops to approx. 3.4 nm at 360 degrees. As on FIG. 1, this characteristic repeats with each orbit.

Figure 3:
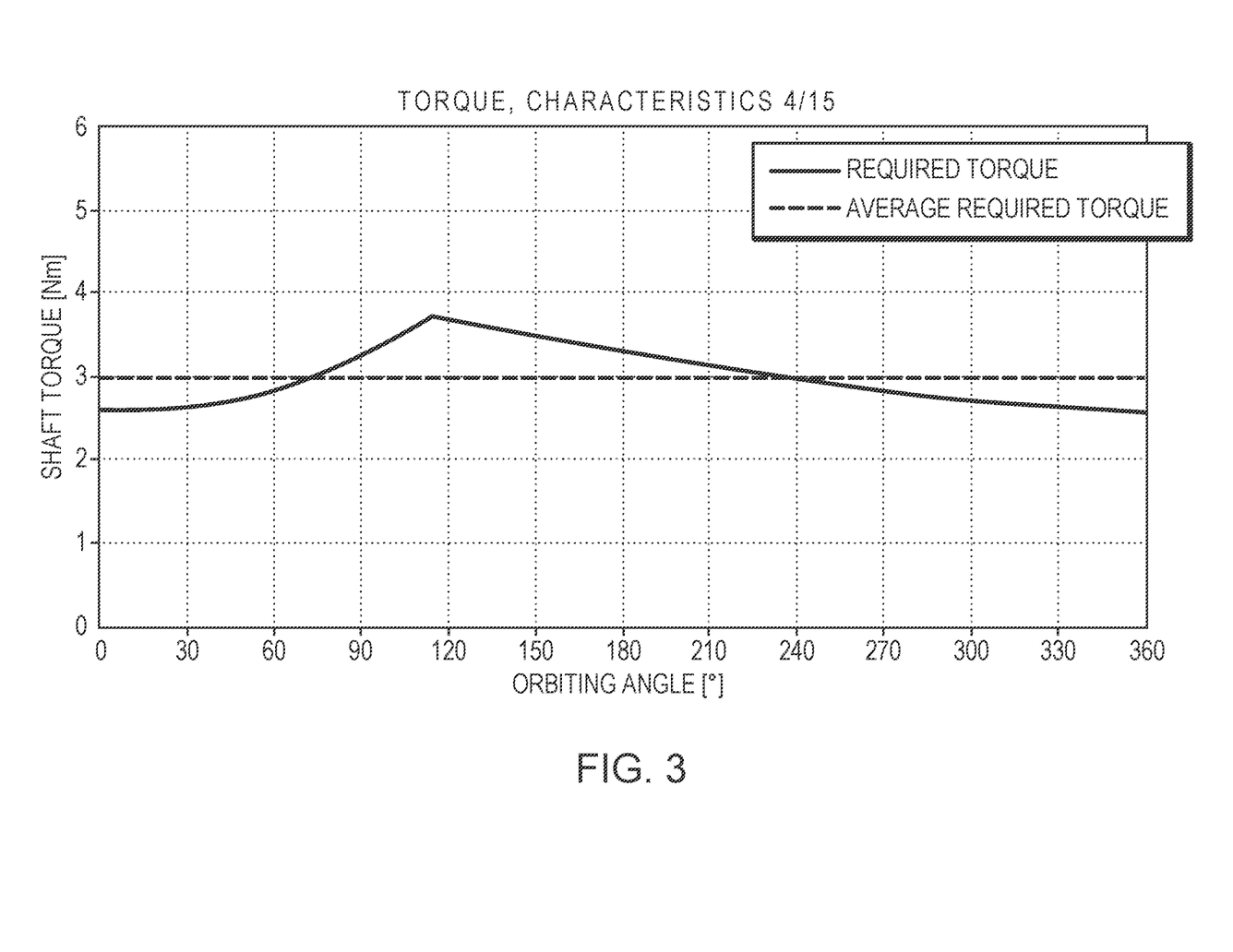
FIG. 3 is a torque characteristic diagram for a scroll compressor with an inlet and outlet pressure ratio of 4/15.

FIG. 3 shows a torque characteristic diagram for a scroll compressor with an inlet and outlet pressure ratio of 4/15. The average required torque for the scroll compressor measures approx. 3.0 nm (see dashed line), so as to realize the mentioned pressure ratio. Depending on the orbiting angle, the actually required torque (see solid line) begins with approx. 2.6 nm at 0 degrees and continuously rises to a maximum of approx. 3.7 nm at 110 degrees. The required torque then continuously drops to a minimum of approx. 2.6 nm at approx. 360. As on FIG. 1, this characteristic repeats with each orbit.

Figure 4:
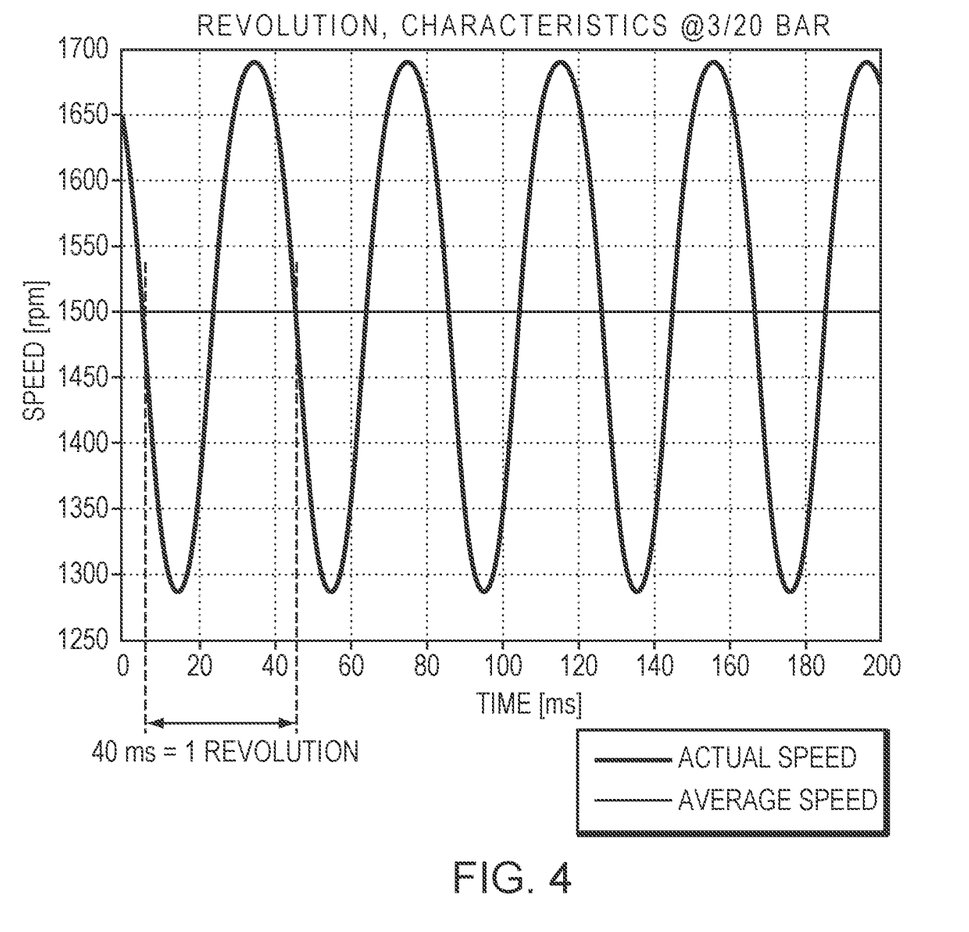
FIG. 4 is a shaft speed diagram of a scroll compressor at a pressure ratio of 3/20.

FIG. 4 shows a shaft speed diagram of a scroll compressor at a pressure ratio of 3/20. The average rotation measures 1500 revolutions per minute (abbreviated rpm). Depending on the varying required torques as shown on FIGS. 1 to 3, the shaft rotation or movable spirals are accelerated or delayed, depending on the orbiting angle, or depending on whether the required torque lies above or below the average value of the scroll compressor.

Figure 5A:
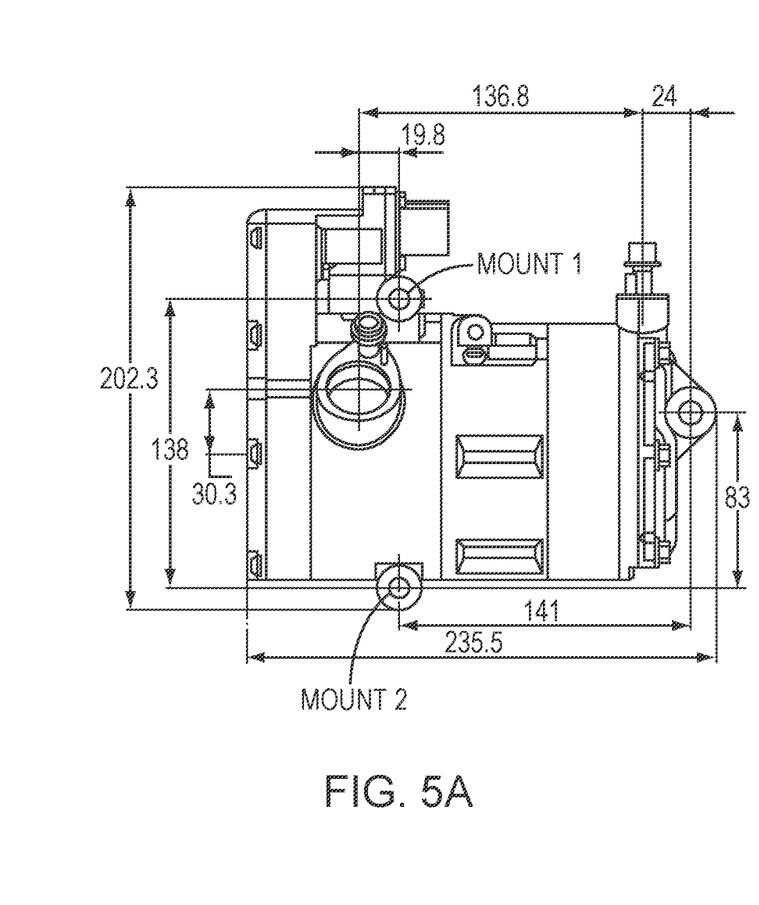
FIG. 5A is a side view of the housing of a scroll compressor.

FIG. 5A shows a side view of the housing of a scroll compressor, illustrating the fastening points mount 1 and mount 2 for fastening the housing, e.g., in a vehicle.

Figure 5B:
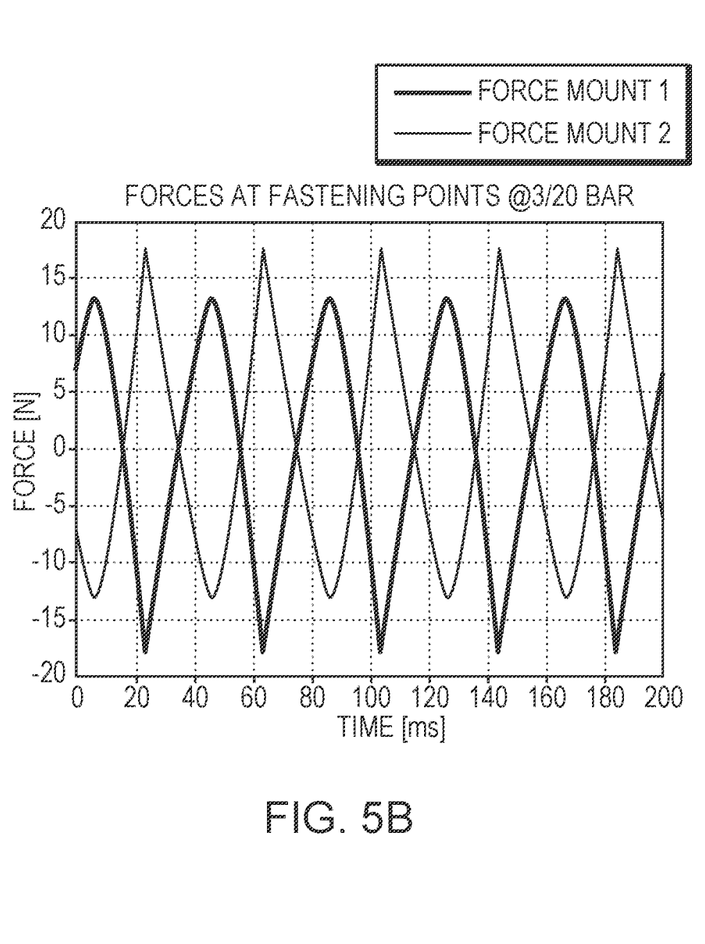
FIG. 5B is an acceleration force diagram on the fastening points mount 1 and 2 of the scroll compressor on FIG. 5A.

FIG. 5B shows an acceleration force diagram on the fastening points mount 1 and 2 of the scroll compressor on FIG. 5A. Vibrations of the scroll compressor cause acceleration forces to act on the fastening points, which can be measured with corresponding sensors. The characteristic of the acceleration forces for mount 1 is mirror inverted or mirrored on the X-axis relative to the characteristic of mount 2.

Figure 6:
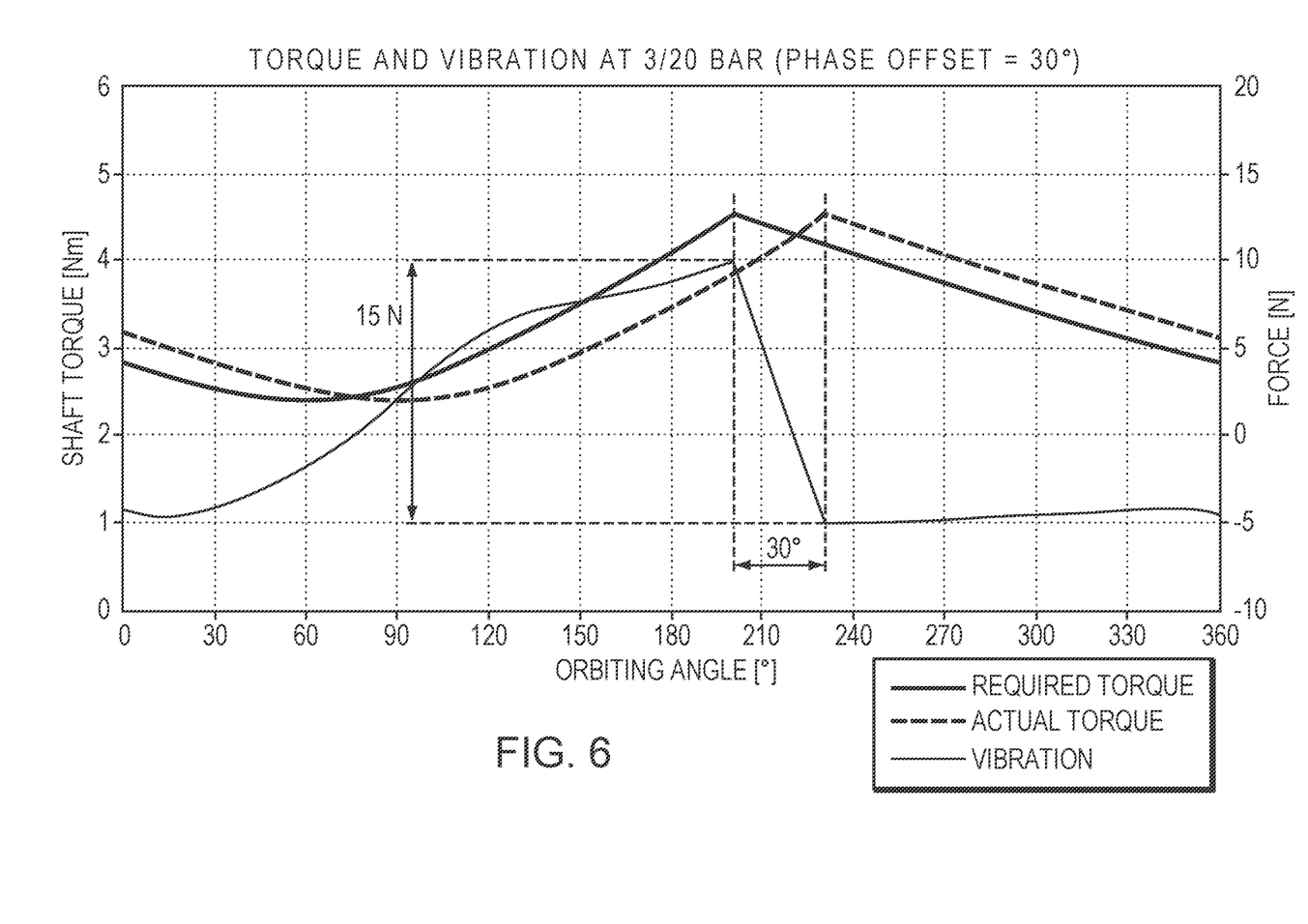
FIG. 6 is a torque diagram of a scroll compressor at a pressure ratio of 3/20 with a phase offset of 30°.

FIG. 6 shows a torque diagram of a scroll compressor at a pressure ratio of 3/20 with a phase or angle offset of 30°. This angle offset lies between the characteristic of the required torque (see solid line, hereinafter abbreviated as "RT"—required torque) and the characteristic of the actually available torque (see dashed line, hereinafter abbreviated as "AT"—actual torque). The angle offset between the maximum of RT and maximum of AT is marked in a readily discernible manner. As soon as the values of RT lie above the values of AT, the vibrations rise (see third solid line and thin line). The vibrations are at 0 Newtons when RT and AT intersect. The vibrations have a maximum amplitude value (between the maximum and minimum) of 15 N.

Figure 7:
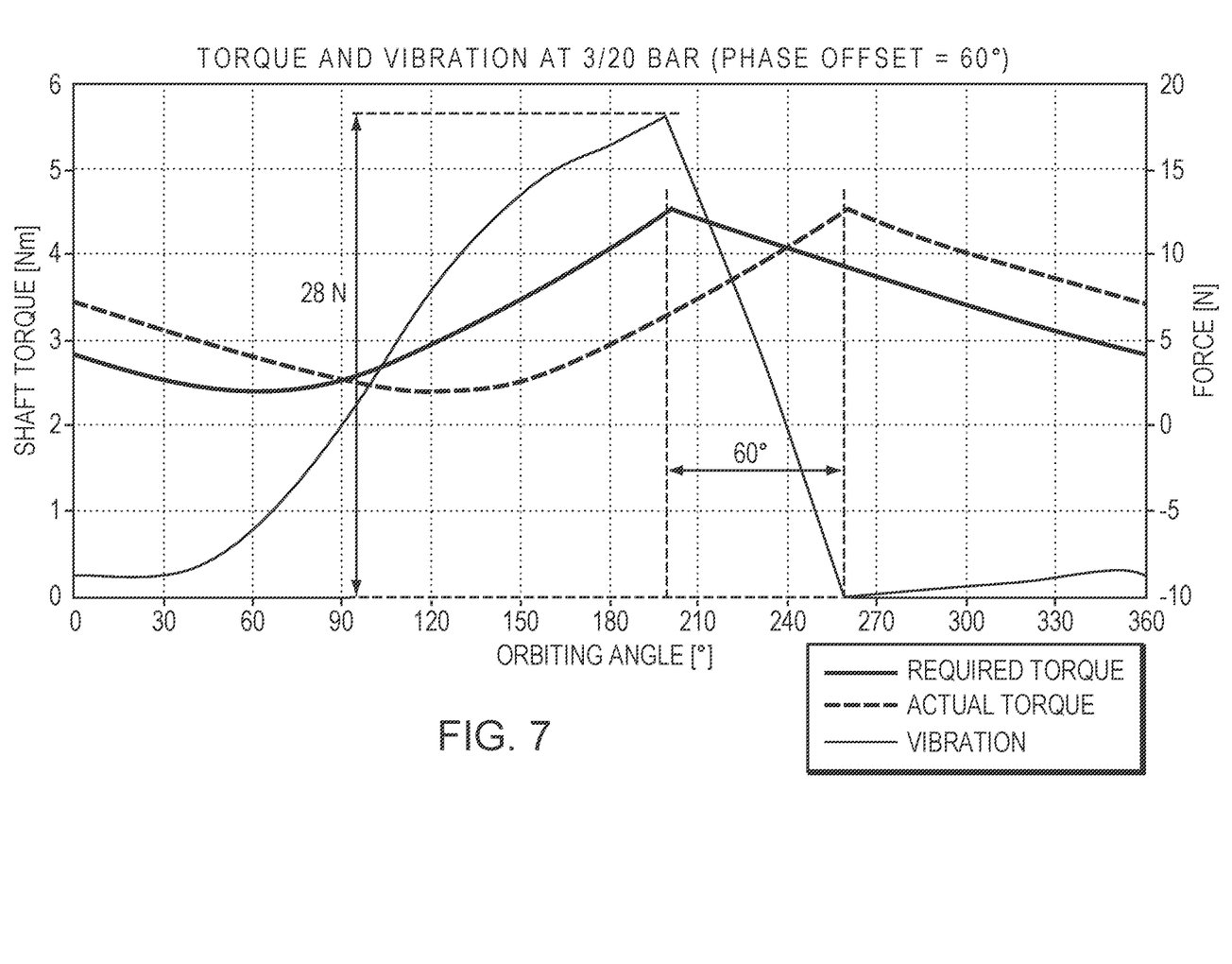
FIG. 7 is a torque diagram of a scroll compressor at a pressure ratio of 3/20 with a phase offset of 60°.

FIG. 7 shows a torque diagram of a scroll compressor at a pressure ratio of 3/20, similarly to FIG. 6, but in this case with a phase offset of 60°. The vibrations have a maximum amplitude value (between the maximum and minimum) of 28 N.

Figure 8:
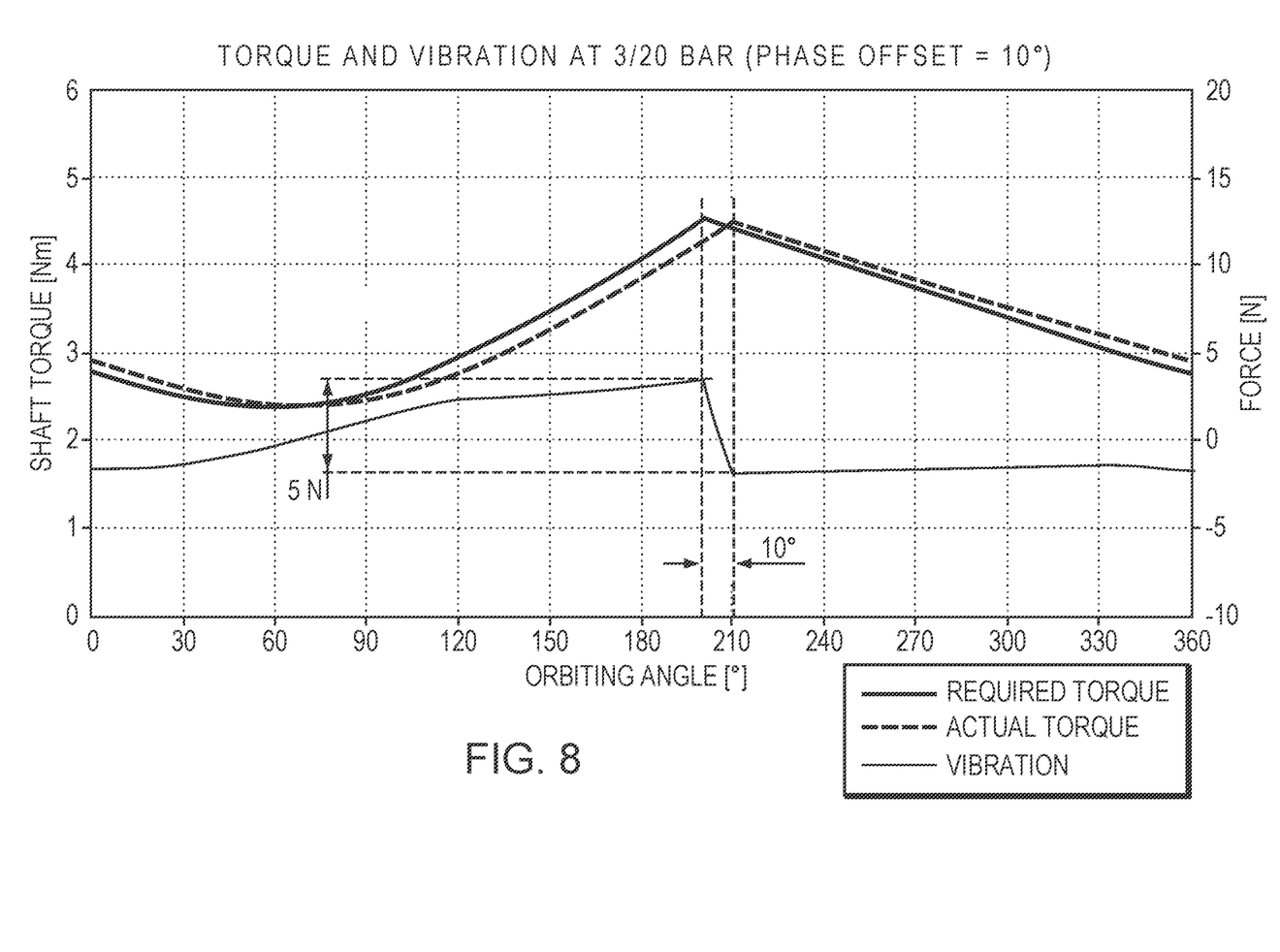
FIG. 8 is a torque diagram of a scroll compressor at a pressure ratio of 3/20 with a phase offset of 10°.

FIG. 8 shows a torque diagram of a scroll compressor at a pressure ratio of 3/20, similarly to FIG. 6, but in this case with a phase offset of 10°. The vibrations have a maximum amplitude value (between the maximum and minimum) of 5 N.

Figure 9:
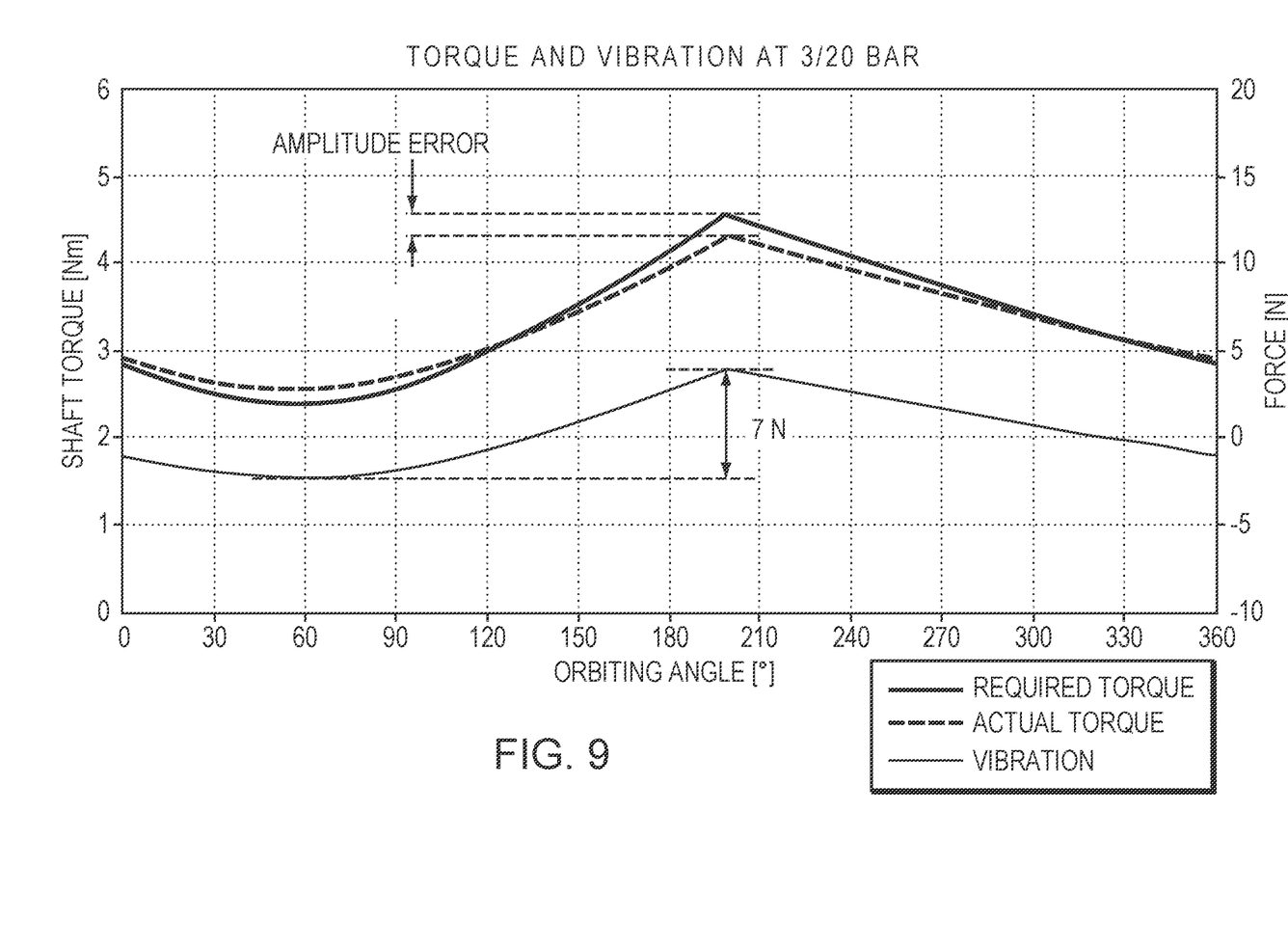
FIG. 9 is a torque diagram of a scroll compressor at a pressure ratio of 3/20 and an amplitude error or offset.

FIG. 9 shows a torque diagram of a scroll compressor at a pressure ratio of 3/20 and an amplitude offset (English amplitude error). The vibrations have a maximum amplitude value (between the maximum and minimum) of 7 N. In this case, the characteristics RT and AT are in-phase, and not phase-shifted or offset like on FIGS. 6 to 8. This means that the minimums and maximums each lie at the same orbiting angles, i.e., in this case at 60 degrees and at 200 degrees. The vibration is also at zero if RT and AT intersect.

Figure 10:
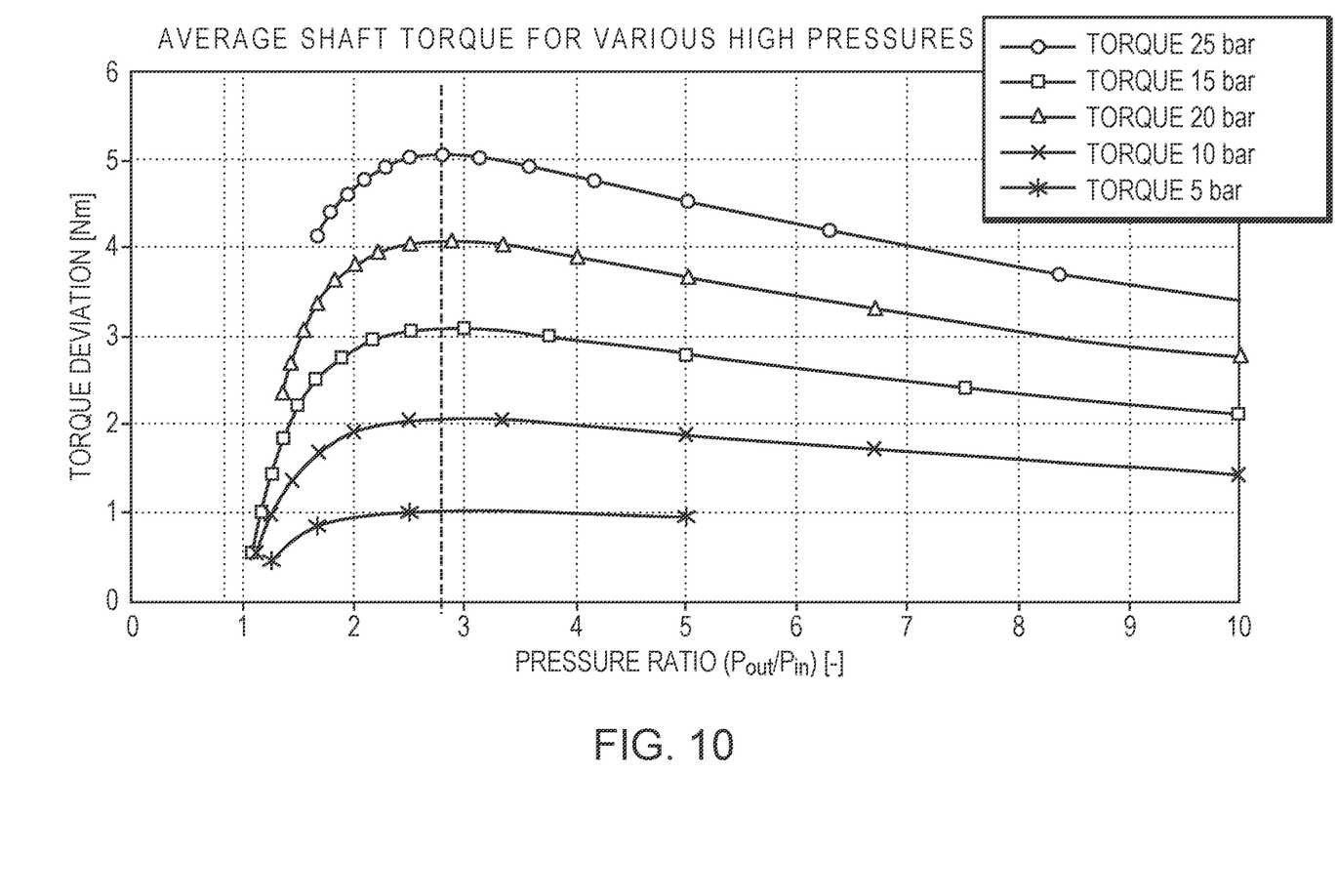
FIG. 10 is a torque diagram of a scroll compressor as a function of the pressure ratio.

FIG. 10 shows a torque diagram of a scroll compressor as a function of the ratio between the outlet pressure $p_{out}$ and inlet pressure $p_{in}$, wherein five characteristics are shown for various outlet pressures. The maximum of all five characteristics lies at approx. 2.8 $p_{out}$ to $p_{in}$.

Figure 11:
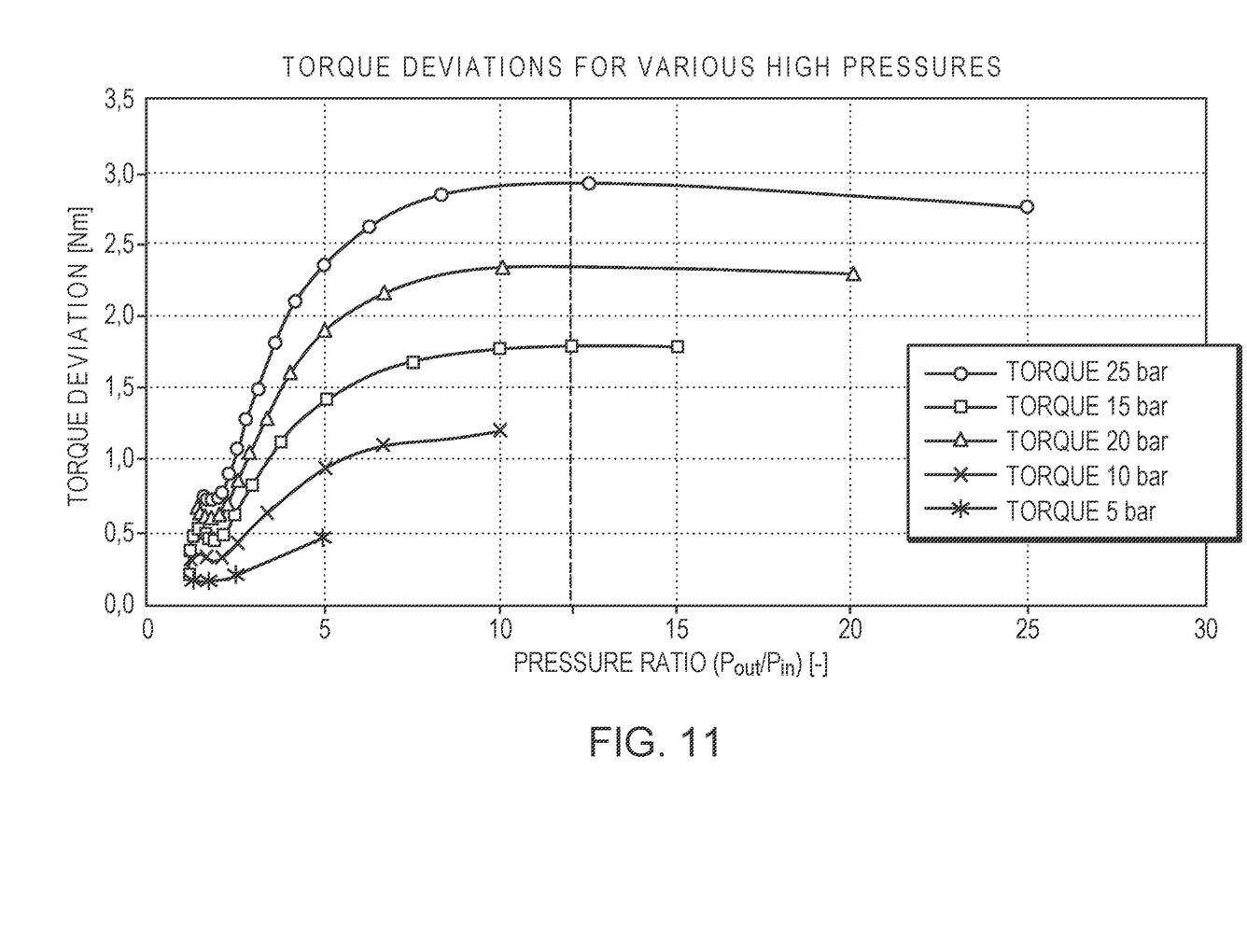
FIG. 11 is a diagram about the torque deviation as a function of the pressure ratio.

FIG. 11 shows a torque diagram of a scroll compressor as a function of the ratio between the outlet pressure $p_{out}$ and inlet pressure $p_{in}$, wherein five characteristics are shown for various outlet pressures. The maximum of all five characteristics lies at approx. 12 $p_{out}$ to $p_{in}$.

Figure 12:
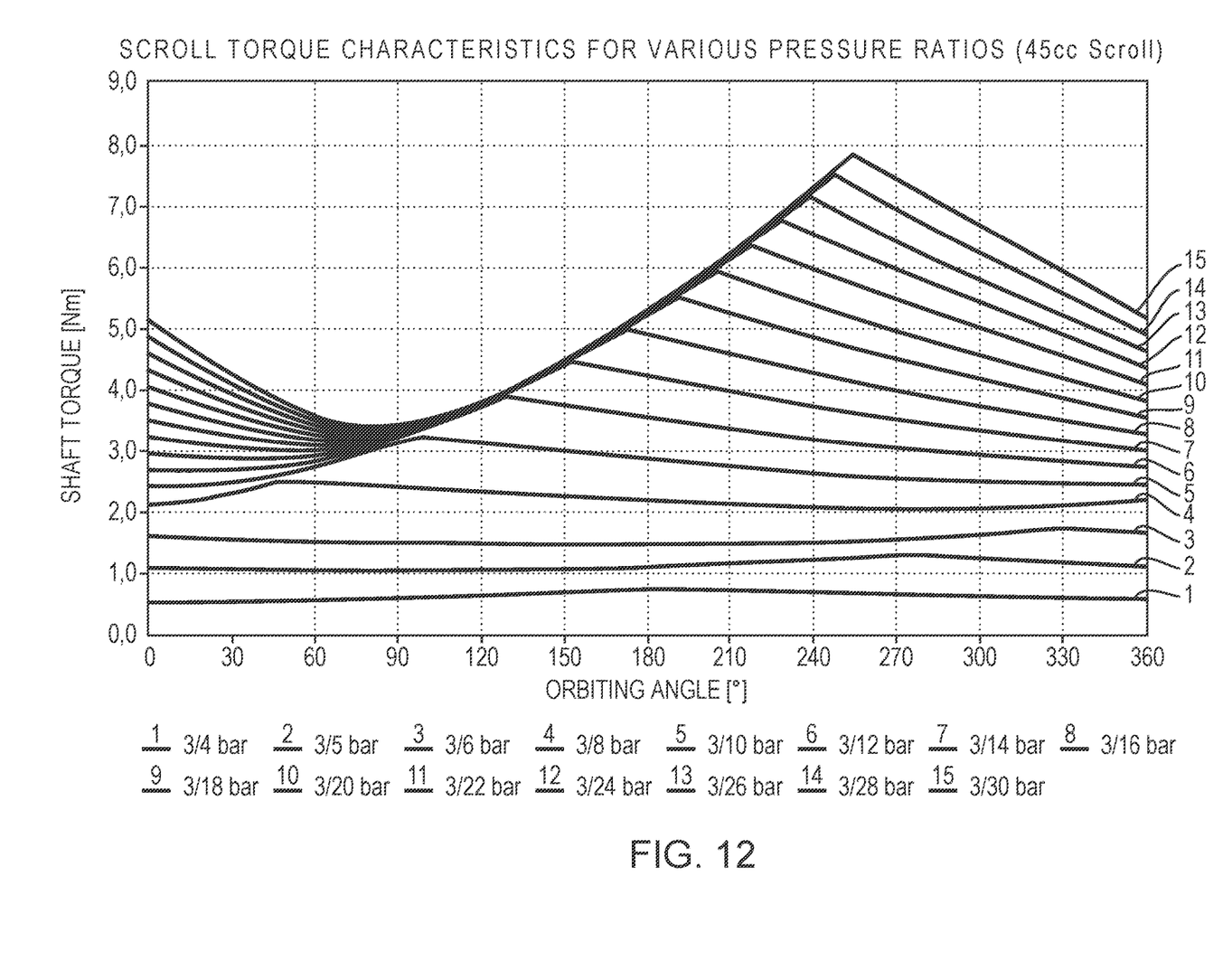
FIG. 12 is a torque diagram of a scroll compressor with a plurality of different characteristics as a function of the orbiting angle.

FIG. 12 shows a torque diagram of a scroll compressor with a plurality of different characteristics as a function of the orbiting angle of 0 degrees to 360 degrees. The different characteristics 1 to 15 stand for the compression rate of the inlet pressure to outlet pressure. While the low characteristics 1 to 4 reveal mostly a continuous progression, very pronounced maximum and minimum values with regard to the required torque are evident at the higher characteristics, e.g., 11 to 15.

The invention claimed is:

1. A method for controlling a scroll compressor having first and second spirals arranged one inside the other, wherein the first spiral moves by operation of a motor relative to the second spiral for one of a decompression or compression operation of the scroll compressor, comprising:
   operating the motor to move the first spiral;
   measuring a plurality of acceleration forces on the scroll compressor, wherein the acceleration forces depend on one of a relative position or a positional angle of the first spiral to the second spiral; and
   adjusting a torque progression of the motor based on the measured acceleration forces to reduce actual acceleration forces on the motor until a change in a decrease of the acceleration forces reaches a predetermined value, wherein a torque supplied by the motor is shifted as a function of an angle or a phase, or of a positional angle of the second spiral relative to the first spiral.

2. The method according to claim 1, wherein adjusting the torque progression of the motor further comprises:
   shifting a torque phase of the motor in a first direction;
   in response to an increase in the measured acceleration forces, shifting the torque phase of the motor in a second direction opposite to the first direction; and
   in response to a decrease in the measured acceleration forces, continue shifting the torque phase of the motor in the first direction until a minimum for the measured acceleration forces has been reached.

3. The method according to claim 2, wherein adjusting the torque progression of the motor further comprises:

shifting a torque amplitude of the motor in a first direction;
in response to an increase in re-measured acceleration forces, shifting the torque amplitude of the motor in the second direction opposite to the first direction; and
in response to a decrease in the re-measured acceleration forces, continue shifting the torque amplitude of the motor in the first direction until a threshold for the measured acceleration forces has been reached.

4. The method according to claim 1, wherein adjusting the torque progression of the motor further comprises:
shifting a torque phase of the motor in a first direction;
in response to an increase in the measured acceleration forces, shifting the torque phase of the motor in a second direction opposite to the first direction; and
in response to a decrease in the measured acceleration forces, continue shifting the torque phase of the motor in the first direction until the measured acceleration forces no longer exceed a pre-determined threshold.

5. The method according to claim 1, wherein adjusting the torque progression of the motor comprises:
shifting a torque amplitude of the motor in a first direction;
in response to an increase in the measured acceleration forces, shifting the torque amplitude of the motor in a second direction opposite to the first direction; and
in response to a decrease in the measured acceleration forces, continue shifting the torque amplitude of the motor in the first direction until a minimum for the measured acceleration forces has been reached.

6. The method according to claim 1, wherein adjusting the torque progression of the motor comprises:
shifting a torque amplitude of the motor in a first direction;
in response to an increase in the measured acceleration forces, shifting the torque amplitude of the motor in a second direction opposite to the first direction; and
in response to a decrease in the measured acceleration forces, continue shifting the torque amplitude of the motor in the first direction until the measured acceleration forces no longer exceed a pre-determined threshold.

7. A controller for a scroll compressor having first and second spirals arranged one inside the other, wherein the first spiral moves by operation of a motor relative to the second spiral, comprising:
a processor configured to execute instructions for operating the motor, the instructions configured to,
move the first spiral;
measure a plurality of acceleration forces on the scroll compressor, wherein the acceleration forces depend on one of a relative position or a positional angle of the first spiral to the second spiral; and
adjust a torque progression of the motor based on the measured acceleration forces to reduce actual acceleration forces on the motor,
until a change in a decrease of the acceleration forces reaches a predetermined value, wherein a torque supplied by the motor is shifted as a function of an angle or a phase, or of a positional angle of the second spiral relative to the first spiral.

8. The controller according to claim 7, wherein the processor configured to execute instructions for operating the motor configured to adjust the torque progression of the motor include instructions further configured to:
shift a torque phase of the motor in a first direction;
in response to an increase in the measured acceleration forces, shift the torque phase of the motor in a second direction opposite to the first direction; and
in response to a decrease in the measured acceleration forces, continue to shift the torque phase of the motor in the first direction until a minimum for the measured acceleration forces has been reached.

9. The controller according to claim 8, wherein the processor configured to execute instructions for operating the motor configured to adjust the torque progression of the motor include instructions further configured to:
shift a torque amplitude of the motor in a first direction;
in response to an increase in the measured acceleration forces, shift the torque amplitude of the motor in a second direction opposite to the first direction; and
in response to a decrease in the measured acceleration forces, continue to shift the torque amplitude of the motor in the first direction until a threshold for the measured acceleration forces has been reached.

10. The controller according to claim 7, wherein the processor configured to execute instructions for operating the motor configured to adjust the torque progression of the motor include instructions further configured to:
shift a torque phase of the motor in a first direction;
in response to an increase in the measured acceleration forces, shift the torque phase of the motor in a second direction opposite to the first direction; and
in response to a decrease in the measured acceleration forces, continue to shift the torque phase of the motor in the first direction until the measured acceleration forces no longer exceed a pre-determined threshold.

11. The controller according to claim 7, wherein the processor configured to execute instructions for operating the motor configured to adjust the torque progression of the motor include instructions further configured to:
shift a torque amplitude of the motor in a first direction;
in response to an increase in the measured acceleration forces, shift the torque amplitude of the motor in a second direction opposite to the first direction; and
in response to a decrease in the measured acceleration forces, continue to shift the torque amplitude of the motor in the first direction until a minimum for the measured acceleration forces has been reached.

12. The controller according to claim 7, wherein the processor configured to execute instructions for operating the motor configured to adjust the torque progression of the motor include instructions further configured to:
shift a torque amplitude of the motor in a first direction;
in response to an increase in the measured acceleration forces, shift the torque amplitude of the motor in a second direction opposite to the first direction; and
in response to a decrease in the measured acceleration forces, continue to shift the torque amplitude of the motor in the first direction until a threshold for the measured acceleration forces has been reached.

13. A non-transitory computer readable medium including program instructions for execution on a processor, the program instructions configured to:
operate a motor to move a first spiral of scroll compressor, wherein the scroll compressor has the first spiral and a second spiral arranged one inside the other, wherein the first spiral moves by operation of the motor relative to the second spiral for one of a decompression or compression operation of the scroll compressor;
measure a plurality of acceleration forces on the scroll compressor, wherein the acceleration forces depend on one of a relative position or a positional angle of the first spiral to the second spiral; and adjust a torque progression of the motor based on the measured acceleration forces to reduce actual acceleration forces on the motor, until a change in a decrease of the acceleration forces reaches a predetermined value, wherein a torque supplied by the motor is shifted as a function of an angle or a phase, or of a positional angle of the second spiral relative to the first spiral.

14. The non-transitory computer readable medium of claim 13, wherein the program instructions configured to adjust the torque progression of the motor include program instructions further configured to:

shift a torque phase of the motor in a first direction;
re-measure the plurality of acceleration forces;
in response to an increase in the re-measured acceleration forces, shift the torque phase of the motor in a second direction opposite to the first direction; and
in response to a decrease in the re-measured acceleration forces, continue to shift the torque phase of the motor in the first direction until a minimum for the measured acceleration forces has been reached.

15. The non-transitory computer readable medium of claim 14, wherein the program instructions configured to adjust the torque progression of the motor include program instructions further configured to:

shift a torque amplitude of the motor in a first direction;
in response to an increase in the re-measured acceleration forces, shift the torque amplitude of the motor in a second direction opposite to the first direction; and
in response to a decrease in the re-measured acceleration forces, continue to shift the torque amplitude of the motor in the first direction until a threshold for the re-measured acceleration forces has been reached.

16. The non-transitory computer readable medium of claim 13, wherein the program instructions configured to adjust the torque progression of the motor include program instructions further configured to:

shift a torque amplitude of the motor in a first direction;
in response to an increase in the measured acceleration forces, shift the torque amplitude of the motor in a second direction opposite to the first direction; and
in response to a decrease in the measured acceleration forces, continue to shift the torque amplitude of the motor in the first direction until a threshold for the measured acceleration forces has been reached.

17. The non-transitory computer readable medium of claim 13, wherein the program instructions configured to adjust the torque progression of the motor include program instructions further configured to:

shift a torque phase of the motor in a first direction;
re-measure the plurality of acceleration forces;
in response to an increase in the re-measured acceleration forces, shift the torque phase of the motor in a second direction opposite to the first direction; and
in response to a decrease in the re-measured acceleration forces, continue to shift the torque phase of the motor in the first direction until a minimum for the measured acceleration forces has been reached.

18. The non-transitory computer readable medium of claim 13, wherein the program instructions configured to adjust the torque progression of the motor include program instructions further configured to:

shift a torque amplitude of the motor in a first direction;
in response to an increase in the measured acceleration forces, shift the torque amplitude of the motor in a second direction opposite to the first direction; and
in response to a decrease in the measured acceleration forces, continue to shift the torque amplitude of the motor in the first direction until a threshold for the acceleration forces has been reached.

\* \* \* \* \*